United States Patent [19]

Lalikos et al.

[11] 4,196,031
[45] Apr. 1, 1980

[54] METHOD OF MAKING A PREFORMED SEMIRIGID PLASTIC HOSE WRAPPED WITH A WIRE SPIRAL

[75] Inventors: James M. Lalikos, Springfield; Harold K. Waite, East Longmeadow; Kenneth E. Lefebvre, Hampden, all of Mass.

[73] Assignee: Titeflex Corporation, Springfield, Mass.

[21] Appl. No.: 885,389

[22] Filed: Mar. 10, 1978

[51] Int. Cl.² .............................................. B32B 1/08
[52] U.S. Cl. .................................. 156/143; 138/121; 138/122; 138/132; 138/144; 138/145; 156/144; 156/173; 156/244.15
[58] Field of Search ............... 156/143, 144, 177, 178, 156/198, 205, 244.15, 244.21, 244.25, 245, 462; 138/121, 127, 132, 140, 173, 144, 145

[56] References Cited

U.S. PATENT DOCUMENTS

| | | | |
|---|---|---|---|
| 2,713,381 | 7/1955 | Seck | 138/122 |
| 2,895,001 | 7/1959 | Noyes et al. | 156/143 |
| 3,089,535 | 5/1963 | Vohrer et al. | 156/173 |
| 3,891,007 | 6/1975 | Kleykamp | 156/244.15 |
| 3,913,622 | 10/1975 | Holden et al. | 138/121 |
| 3,913,625 | 10/1975 | Gazda et al. | 138/145 |
| 4,000,341 | 12/1976 | Matson | 138/121 |

Primary Examiner—Caleb Weston

[57] ABSTRACT

The invention provides a hose that withstands a vacuum which is considered to be approximately two to three times greater than the vacuum withstood by the best known previously available pliable convoluted semirigid plastic hoses of comparable designs. To fabricate the hose, a bobbin of wire stock is unwound, with the wire preferably being pulled off the end of the bobbin. The wire is then looped around a spool to form it into a spiral or coil having a preset diameter which is proportionately smaller than the diameter of a preformed, semirigid convoluted plastic hose. While the pulled wire is still substantially extended, it is taken up by being rolled upon the plastic hose, thereby snapping the preset formed wire spiral into the spiral convolutions formed in the surface of the hose. If desired, the spiral or coil might be pulled off the end of the smaller diameter spool to impart a twist thereto.

10 Claims, 9 Drawing Figures

METHOD OF MAKING A PREFORMED SEMIRIGID PLASTIC HOSE WRAPPED WITH A WIRE SPIRAL

This invention relates to wire wrapped hoses, and more particularly to semirigid, convoluted plastic hoses made from material such as polytetrafluoroethylene, which is marketed generally under the trademark "Teflon", with a spiral wire spring wrapped thereon, primarily, although not exclusively, for use as a vacuum hose.

Hoses of the inventive type have many different forms, purposes and uses. However, it is presently intended that the inventive hoses will primarily be used for high vacuum lines. The substantial users of these hoses may be the aircraft and petro-chemical fields of endeavor.

Initially, these hoses begin as a molded, or otherwise preformed, semirigid rubber-like or plastic hose having spiral convolutions formed thereof. To reinforce and protect the hoses, a wire may be wound around the convoluted surfaces and nested in the valleys of the preformed convolutions. Preferably, the diameter of the wire and the width of the convolution valleys are such that the wire snaps snugly into the valley under the force of a spring tension formed into the wire. The composite wire wrapped convoluted tubing or hose then becomes radially stronger and better able to withstand a high internal vacuum.

A principal problem encountered in manufacturing these hoses is to properly wind the wire around the convolutions of the semirigid hose, in a manner such that the wire is seated perfectly. The wire should be both contained within the valleys of the convolutions and may, under some conditions, project slightly above the peaks on the opposite sides of the convoluted valley. The plastic should be formed so that the wire snaps snugly into position and is securely captured by the "Teflon" convolutions. The wire must be wound and snapped into place in a manner which does not chafe, cut, or otherwise damage the plastic of the hose. In addition, the wire may be prestressed in a manner such that it retains its helical form, but not in a manner which may tend to cause it to cut or embed into the plastic hose surface. If the stress upon the wire is a preformed spiral, it should fit the hose and should not be distorted permanently when it is wound upon the hose.

Accordingly, an object of this invention is to provide new and improved wire wrapped, convoluted hoses. Here an object is to provide wire wrapped plastic hoses, and particularly wire wrapped "Teflon" hoses. In this connection, an object is to form a vacuum hose which may withstand substantial vacuum forces without danger of collapsing.

A further object is to provide a hose which resists handling damage, such as crushing or kinking when stepped on or overbent.

Another object of the invention is to provide new and improved methods of and means for manufacturing wire wrapped hoses. In particular, an object is to provide methods of wrapping a preferably prestressed spiral or coiled wire around a molded or formed semirigid, convoluted plastic hose, without permanently distorting the spiral of the wire form.

In keeping with an aspect of the invention, these and other objects are accomplished by preforming a spirally convoluted, semirigid hose, made from a plastic material, such as "Teflon". In a preferred embodiment, a spring wire is pulled off the end of a supply bobbin and looped around a pulley or idler spool, which is a coil forming wheel having a diameter that is correlated to the diameter of the plastic hose. The wire is then pulled from the end of the forming wheel, over a controlled radius guide or shoe, to the hose surface. The looping on the forming wheel, followed by the pulling therefrom via the circular guide, gives the wire a permanently preformed circularized and spiral shape. The resulting spiral shape enables the wire to snap into the hose convolutions as it is wound directly onto the plastic hose. The relative diameter of the wire, the width of the space between the convolutions, and the diameters of the forming wheel and plastic hose are such that the wire is securely captured within the valley of the convolutions after it snaps into position.

The nature of a preferred embodiment may be understood from the attached drawings, wherein:

FIG. 1 is a perspective view, partly in cross section, of the inventive hose, the section line being taken to clearly show the convolutions of the hose and the wires;

FIG. 2 schematically shows the inventive process;

FIG. 3 schematically shows the path of the wire from a supply bobbin to the hose;

Figure 8:
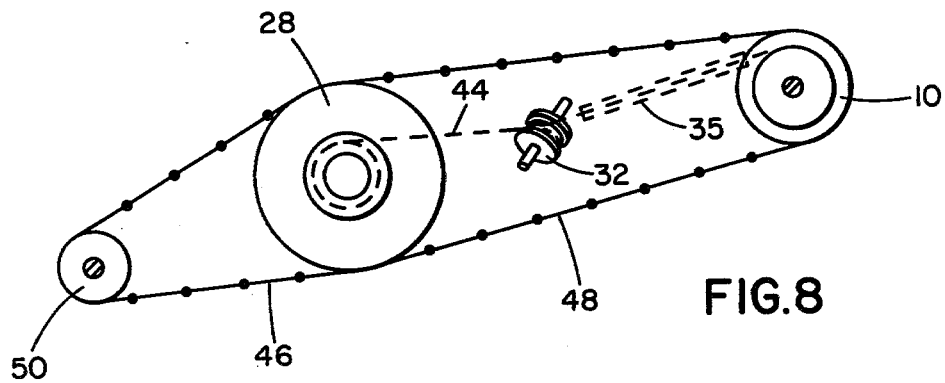
Figure 9:
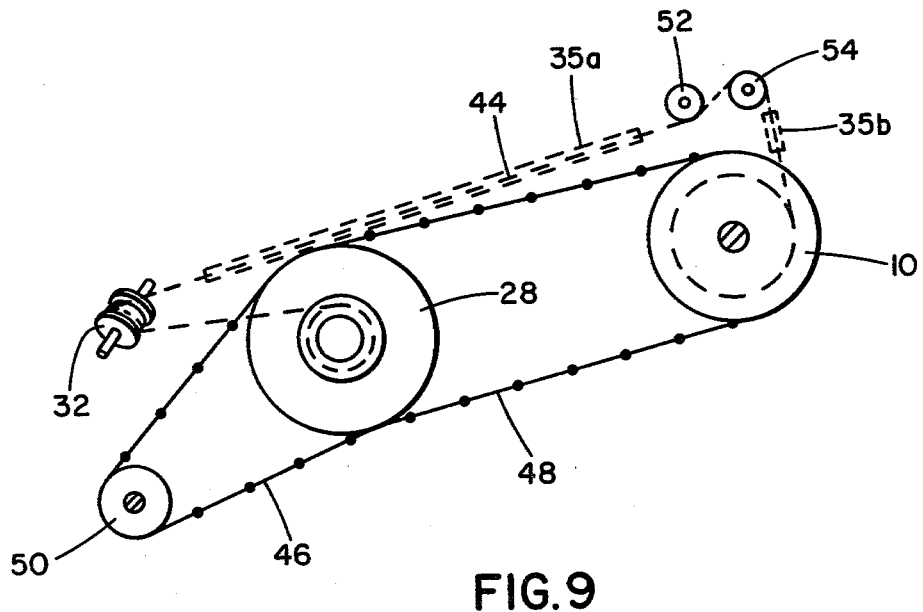

FIG. 8 schematically shows a second embodiment of a wire wrapped hose production machine; and FIG. 9 schematically shows a third embodiment of a wire wrapped hose production machine.

Figure 1:
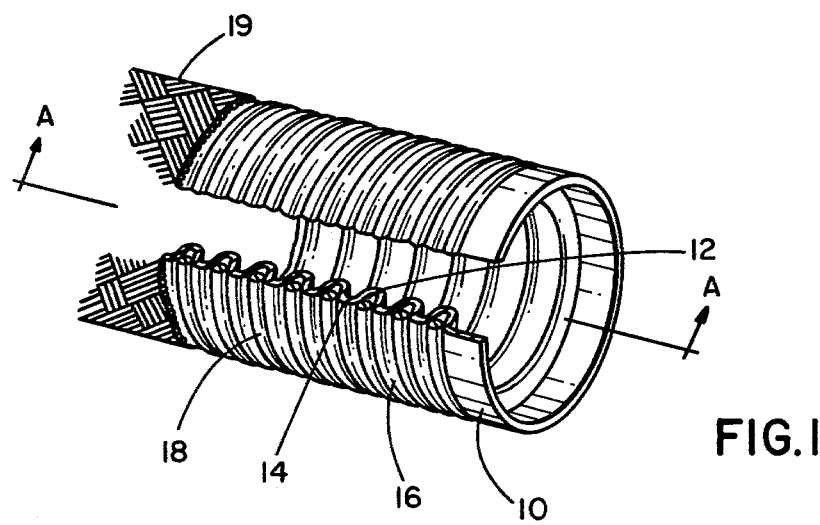

The inventive hose (FIG. 1) has been here shown as being cut along line A—A, to reveal the cross section of the plastic hose 10 and the wire 18. Any suitable braid cover 19 may be wrapped or braided around the hose.

The first hose part 10 is a semirigid plastic hose having a spirally convoluted surface. The outside hose surface includes a valley 12 having peaks 14 and 16 on the opposite sides of the valley. The valleys and peaks of the convolutions spiral uniformly down the length of the hose. The plastic part may be made in any suitable manner which is known to those skilled in the art. For example, it may be made of "Teflon", which is extruded from a head having a spiral ridge forming member, or the convoluted tubing may be formed utilizing a spiral wrapping method using "Teflon" tape and subsequently sintered.

The convoluted plastic hose 10 is preferably covered with an interleaving tape 21 (FIG. 4) or other suitable interleaving material which protects the hose 10, especially from the wire spring 18. Preferably, this may be a woven tape made from about 0.010 inch fiber glass, and covered on the side adjacent the hose by a pressure sensitive adhesive. Thus, the tape 21 may conveniently be applied by winding it along the bias and upon the outer surface of the convoluted hose.

The second part of the hose is a spiral (preferably stainless steel) spring wire 18 which is wrapped around the hose and is positioned within the valley 12 of the convolutions. Other types of spring wire material may be used, such as beryllium-copper, phos-copper, monel, and high carbon steel. The diameter of the wire and the width of the valley is such that the wire 18 snaps snugly within the valley, so that the wire will not escape. Alternatively, the wire may also be positioned to project slightly above the level of the adjacent peaks 14, 16 of the convolutions to provide a wear resistant characteristic for the hose.

In one embodiment, the invention addresses itself to the problem of wrapping the wire around the semirigid plastic hose in a manner which balances the lowest production cost, the most serviceable hose, the least damage to the wire and plastic, and an attractive appearance. Especially when the wire is also used as an electrical ground, it should be completely reliable over the entire lifetime of the hose, under extreme rough usage conditions. For example, if the inventive hose is used in an explosive atmosphere, such as in a fueling area for an aircraft, the ground wire may prevent sparks if the hose touches the aircraft.

Figure 2:
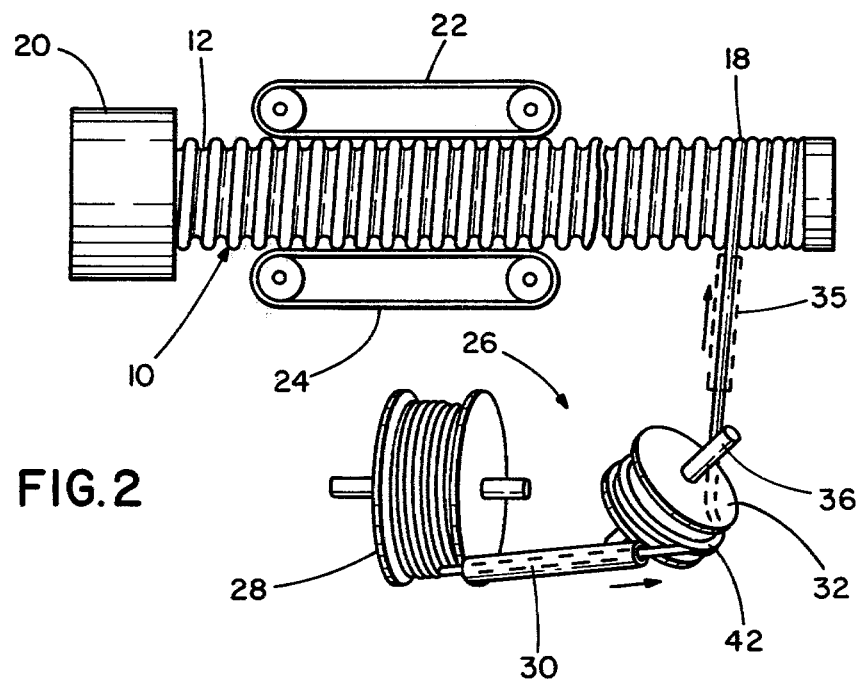

FIG. 2 schematically shows the principles involved in the inventive method of making the hose. In greater detail, the plastic hose is initially formed in any suitable manner by extrusion or wrapping. In one embodiment, the hose may be made of "Teflon". Several machines for extruding "Teflon" hoses are shown in U.S. Pat. No. 3,913,625, issued Oct. 21, 1975, inventors Chester T. Gazda and James M. Lalikos, for "POLY-POLYMER PLASTIC MATERIAL AND DEVICE MADE THEREFROM", assigned to the assignee of this invention.

As the hose emerges from the head 20, it is in the form of a convoluted spiral. After a suitable distance beyond the head 20, at least one pair of endless belts 22, 24 support and convey the hose 10 past a wire wrapping station 26. After the wire wrapping station, the hose may be moved through any suitable braid applying station, where the braid 19 is applied in a conventional manner.

As the wire is pulled off the end of the bobbin 28, it may pass through a suitable tubular guide 30, to a spring forming spool 32, and then through a radius guide 35 to be wound upon the hose 10. Preferably, the spool 32 is mounted upon a self-positioning yoke 36 which enables it to assume an attitude of minimum stress, which will tend to be tangential to the spool.

In a preferred embodiment of the invention, the wire is preformed into a spiral form. In greater detail, the guide 30 is set at an angle, with respect to the axle of the bobbin 28, which pulls the supply wire tangentially off the end of the supply bobbin. Then, the wire is looped around the forming spool 32, having a diameter which is selected according to the outside diameter of the hose 10. For example, a hose having an outside diameter of 2 5/16" might use a wire looped around a forming spool 32 having a diameter in the order of 1¾" to 2⅛", selected to produce convolutions in the spring wire with an internal convolution diameter, which snaps into the valley of the convolution around the plastic hose. In an actual use, the manufacture might start with a forming spool 32 having an initial diameter of ½", which could be increased or decreased until an optimal size of wire spiral is found.

After the wire 18 is wrapped around the forming spool 32, it is pulled off the end thereof to impart a further formation to the wire. The resulting geometry of the wire is a spiral. As it is pulled out about three feet or so from the forming spool 32, either the wire is wrapped about the plastic hose 10, or it is rotated about its internal axis to wind the wire spring around it, and thereby form the composite structure of FIG. 1.

The plastic material forming the hose 10 tends to tension the spring formed by the wire 18. The spring tends to compress the plastic of the hose, and the internal molecular working of the plastic hose tends to damp the vibrations of the spring. Thus, together the wire spring and the hose plastic cooperate to produce a superior hose.

Figure 3:
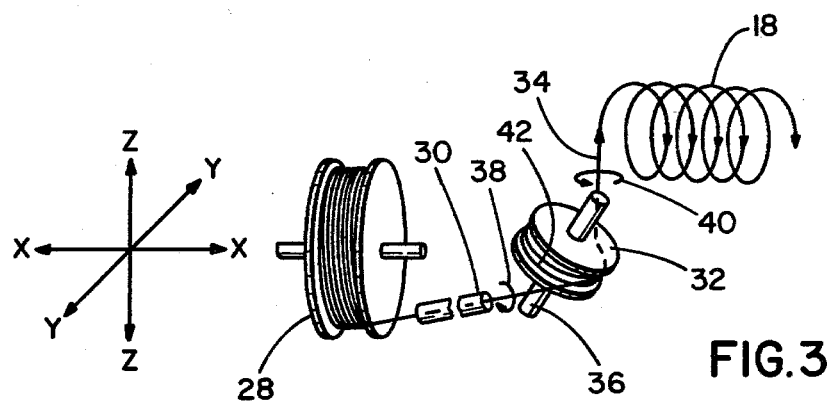

Another, but not necessarily preferred, embodiment employs a path which the wire might follow, as shown in FIG. 3, which illustrates how the wire is twisted at 38 and at 40, as it is shaped by the forming spool 32 into a tight spiral at 42. Then, the twisted spiral wire is wrapped around the hose. In greater detail, for this particular embodiment, each complete turn of the wire which is wound upon the bobbin 28 lies in a plane, which is shown in FIG. 3 by the Y-Z axes. The wire pulled from the bobbin 28 travels along the X—X axis and through the wire guide 30. The loop 42 formed around the loop 32 lies in the X-Y plane. The wire pulled from the spool 32 travels along the Z axis to reach and encircle the hose 10, where the turns lie in substantially the plane of the Y-Z axes.

Regardless of the embodiment used, the wire 18 positions itself in the valley of the hose (FIG. 4), as it advances under the urging of the endless belts 22, 24. Then, preferably, the composite hose structure is subjected to heat and pressure to form an outside hose surface into a somewhat flattened form with the wire captured by, and at least partially embedded in the shaped plastic (FIG. 5).

Figure 6:
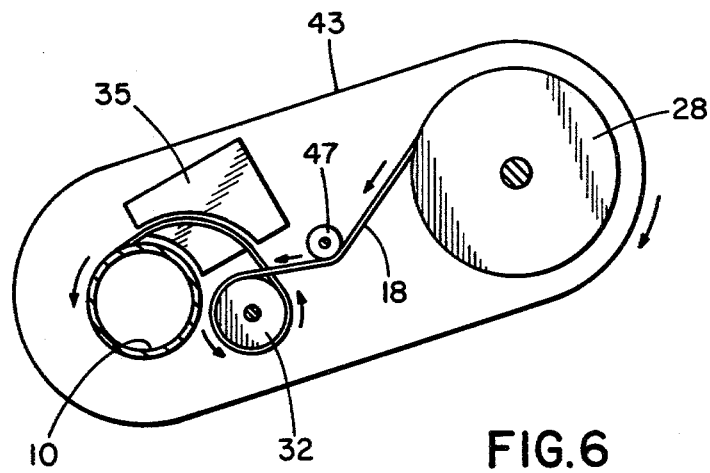
FIG. 6 is an end view of a preferred embodiment of a wire wrapping head.
Figure 7:
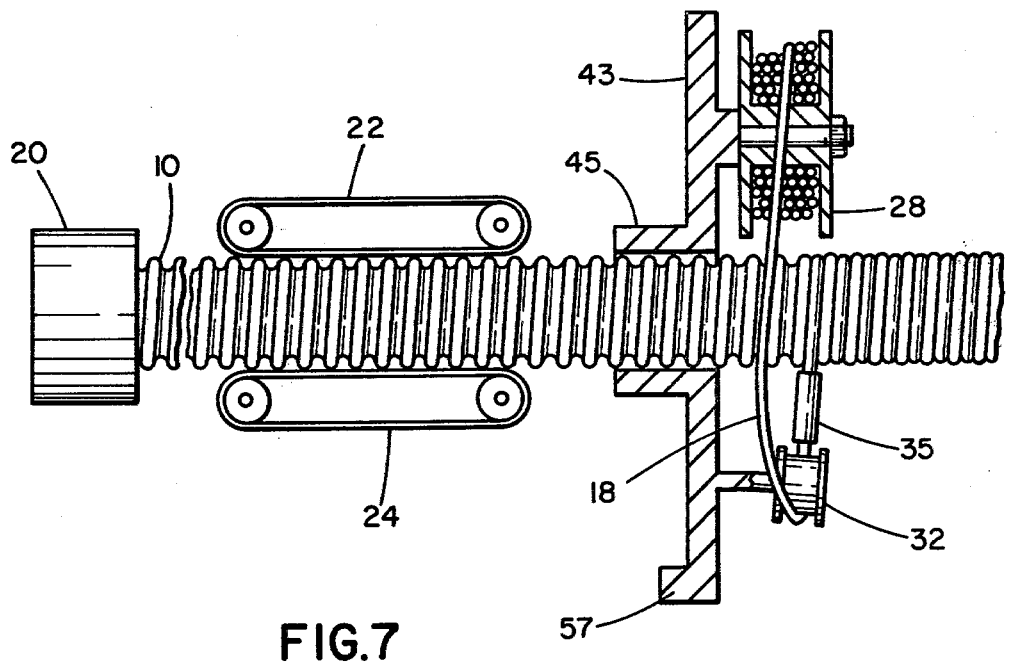
FIG. 7 is a side view of the wire wrapping production machine of FIG. 2 used in conjunction with the head of FIG. 6.

A preferred embodiment of a wire wrapping machine which incorporates the invention is seen in FIGS. 6 and 7. According to this embodiment, an elongated arm 43 is mounted to rotate about a supporting journal 45 through which the convoluted hose 10 may feed. The hose 10 may move longitudinally, but it does not rotate.

Rotatably mounted on the end of the arm 43 is the supply bobbin 28 for the wire stock. The wire is pulled from the bobbin, trained over one or more guide rollers 47, around the forming spool 32, through the radius guide 35, and onto the convoluted hose 10. The wire is pulled along this path by the frictional grip of the wire as it is clutched within the convolutions of the hose. A counterbalancing weight 57 may be formed, where required, in order to balance the rotating arm 43.

The radius guide 35 establishes a suitably curved path for the wire 18 to follow. The curve prevents both a straightening of the wire beyond the point where the spiral is distorted or destroyed, and an overly sharp bend which would establish a kink. The distance between the radius guide 35 and the hose 10 is kept at a minimum to reduce as much as possible an unsupported bridging by the wire. If a choice must be made between the radius guide occasionally touching the hose and a longer unsupported wire bridge, it is usually better to allow the radius guide 35 and the hose 10 to come into an occasional contact.

Two other forms of a wrapping machine are shown in FIGS. 8 and 9. In these figures, a dashed line 44 shows the path followed by the wire. A dot-dashed line 46, 48 shows one or more drive chains or belts for transmitting a turning power to both the wire supply bobbin 28 and the hose 10. This drive chain or belt may be the same as or driven by or in synchronism with the endless belts 22, 24 that deliver the convoluted hose from the head 20 to the wire wrapping station 26. Any suitable power source, such as an electric motor 50, drives the chain 46 to turn the supply bobbin 28. The same or a different chain 48 turns the hose 10. Since the wire supply bobbin 28 and the hose 10 are turned by a common drive system, their rotations are synchronized to turn as a unit.

As the wire 44 is pulled from the bobbin 28, it wraps upon the hose 10. As the wire travels from the supply bobbin 28 to the hose, it loops around and turns the forming spool 32 to make a permanent spiral coil, wire form. In the embodiment of FIG. 8, the wire moves in a path directly from the bobbin 28, over the forming spool 32, through the radius guide 35, and onto the plastic hose 10. In the embodiment of FIG. 9, the wire 44 follows a path which reverses at the spool 32, then travels onto and wraps around the hose. Any suitably curved radius guides 35a, 35b may be positioned along the path of the wire in order to insure a preservation of the spiral wire form. Any suitable positional adjustment brackets, brakes, or clutches (not shown), and idlers 52, 54 may also be provided to insure that the wire 44 travels over a desired path. As the hose size changes, the forming spool 32 diameter may be changed to vary the size of the wire turns in the spiral form.

Any suitable braid or scuff coat 19 may be placed over the completed hose, as also indicated at 56 in FIG. 5. Such a coat may take any suitable and known form and may serve any known functions.

Figure 4:
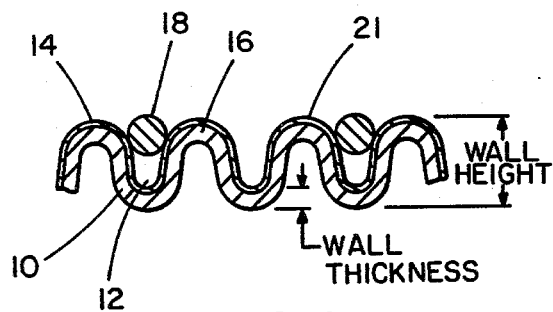
FIG. 4 is a cross section which shows a semirigid hose, as it is initially wrapped with wire.
Figure 5:
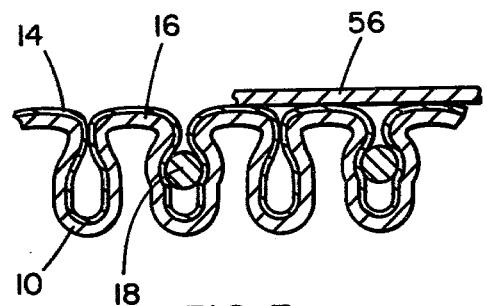
FIG. 5 is a cross section which shows the same hose after it has been subject to a temperature and pressure treatment in order to form the outside surface of the hose, and better capture the wire.

The convoluted hose has a "wall height" and a "wall thickness", as shown and identified in FIG. 4. The wall height is the shortest distance between the top of the convoluted peaks and the bottom of the convoluted valley. The wall thickness is the thickness of the plastic itself.

A number of different types of hoses have actually been constructed and tested with good results. The following table sets forth the dimensions (in inches) of some of these hose types:

| NOMINAL OUTSIDE DIAMETER OF HOSE 10 | WALL HEIGHT | WALL HEIGHT TO OUTSIDE DIAMETER RATIO | WIRE DIAMETER | WIRE DIAMETER TO WALL HEIGHT RATIO |
| --- | --- | --- | --- | --- |
| 1.820 | .140 | 13.0 | .045 | 3.1 |
| 2.315 | .140 | 16.5 | .045 | 3.1 |
| 3.525 | .225 | 15.7 | .045 | 5.0 |
| 4.515 | .280 | 16.1 | .045 | 6.2 |
| 5.030 | .260 | 19.3 | .045 | 5.8 |
| 1.240 | .120 | 10.3 | .035 | 3.4 |
| 1.012 | .115 | 8.8 | .023 | 5.0 |
| 1.217 | .115 | 10.6 | .023 | 5.0 |
| 1.456 | .115 | 12.7 | .027 | 4.3 |
| 1.720 | .115 | 14.9 | .027 | 4.3 |
| 2.210 | .115 | 19.2 | .027 | 4.3 |

As can be seen from the foregoing table, the hoses which have been constructed and tested had a nominal outside diameter in the range of 1.012 to 5.030 inches; the wall height of the hose was in the range of 0.115 to 0.280 inches; the wall height of the outside diameter ratio was in the range of 8.8 to 19.3; the wire diameter was in the range of 0.023 to 0.045 inches; and the ratio of wire diameter to wall height was 3.1 to 6.2.

As a generality, these hoses withstood vacuums at least as high as 28-inches of mercury.

Those who are skilled in the art may perceive other structures and machines which may also accomplish the inventive ends, in the described manner. Accordingly, the appended claims are to be constructed to cover all equivalent structures falling within the true scope and spirit of the invention.

We claim:

1. A process for making a wire wrapped, semirigid, convoluted hose, comprising the steps of:
   (a) forming a semirigid plastic hose having at least an outside surface with a spiral convolution thereon;
   (b) supplying a coil of wire stock mounted concentrically about an axis of rotation;
   (c) pulling said wire from said coil at an angle with respect to the plane in which the turns of said coil lie;
   (d) wrapping said wire about a forming spool of a predetermined diameter to impart a spiral coil form of a predetermined diameter to said wire;
   (e) pulling wire from said coil forming spool at an angle with respect to the plane in which the turns of said spiral coil lie on said spool;
   (f) feeding said wire from said forming spool through a radius guide toward said hose; and
   (g) wrapping the formed spiral coil of said wire about the convolutions of said hose.

2. The process of claim 1 wherein said wire is twisted in steps (c) and (e).

3. The process of claim 1 and the added step of forming said wire wrapped plastic hose under heat and pressure to at least partially embed said wire in the convolutions of said plastic.

4. The process of claim 3 and the added step of covering said formed hose with an outer covering.

5. The process of claim 1 and the added step of interposing a layer of wear resistant material between said wire spring and said convoluted hose.

6. The process of claim 1 wherein said coil of wire stock, forming spool, and radius guide are mounted upon a common arm which rotates about said hose, and the added step of rotating said common arm and its supply of said wire stock of step (b) around said hose in step (f) in order to take up said wire upon said hose, whereby said forming spool turns responsive to the pull established by a frictional grip between said coil of wire and said hose.

7. The process of claim 6 wherein said radius guide is positioned very close to said hose in order to minimize the unsupported length of wire bridging a gap between said radius guide and said hose.

8. The process of claim 1 and the added step of rotating said supply of said wire stock in step (b) and said hose in step (f) responsive to a rotary motion delivered from a common drive source to coordinate the delivery and take-up of said wire stock, and the step of looping said wire over said forming spool, whereby said forming spool turns responsive to movement of said wire from said supply to said take-up of said wire on said plastic hose.

9. The process of claim 1 wherein the hoses have a wall height to outside diameter ratio in the range of 8.8 to 19.3.

10. The process of claim 1 wherein the hoses have a ratio of wire diameter to wall height in the range of 3.1 to 6.2.